April 30, 1957 — F. J. RADD — 2,790,460

CHECK VALVE

Filed May 14, 1953

INVENTOR.
FREDERICK J. RADD.
BY
Oberlin & Limbach
ATTORNEYS.

United States Patent Office 2,790,460
Patented Apr. 30, 1957

2,790,460
CHECK VALVE

Frederick J. Radd, Ponca City, Okla., assignor to Continental Oil Company, Ponca City, Okla., a corporation of Delaware Application May 14, 1953, Serial No. 355,009

7 Claims. (Cl. 137—533.15)

This invention relates to new and useful improvements in valves and particularly to ball and seat type valves for oil well pumps.

In conventional deep well pumps using the ordinary ball and seat type valve, the seat members are subjected to a continual battering or pounding by the dropping of the usual steel ball when such valves are closed and particularly so when the ball is not in perfect alignment with the seat when dropping therein. As a result of such battering, breakage of the ball occasionally occurs and more usually the ball frequently distorts or peens the usual ground surface of the valve seat, resulting in leakage through the valve and necessitating withdrawal of the pumping equipment from the well for replacement of the ball or for repair or replacement of the seat member. The effective life of such seat members varies greatly depending upon well conditions such as the fluid pressure in the well, the rate of stroke operation of the pump, and the like. In some cases, under severe operating conditions, a seat may retain its sealing efficiency for as little as three or four days. In any case, removal of the well rods and pumping equipment for replacement or repair of the defective valve is a relatively expensive operation which is desirably avoided.

Attempts to overcome these difficulties, as by forming the valve seat member itself out of rubber or similar resilient material or by providing the valve seat with a resilient lining have not proven successful because of the relatively short life of such resilient valve seats due to the wear resulting from the battering action of the valve ball and abrasion resulting from sand and other solid impurities in crude oil. Likewise, balls formed of or coated with a resilient material do not have the requisite strength and abrasion resistance required for long life of ball and seat type valves.

One object of this invention, therefore, is to provide an improved form of ball and seat valve construction which substantially reduces the battering and peening action of the ball on the seat member of such valves and to prolong substantially the normal life of such valves.

Another object of this invention is to provide a ball and seat valve construction in which the valve seat is provided with resilient bumper elements forming an auxiliary guide for cushioning the impact of the ball and guiding it into the seat member.

Yet another object of my invention is to provide an improved form of ball and seat valve construction that is simple and inexpensive to manufacture.

A further object of the present invention is to provide an improved form of ball and seat valve construction in which the resilient bumper elements cushioning and guiding the ball into the seat member can easily and inexpensively be replaced.

Other objects of the invention will appear as the description proceeds.

The improvement contemplated by this invention includes the provision of a plurality of separable and replaceable resilient bumper or cushioning elements spaced around the periphery of the valve seat member for absorbing the shock of the initial impact of the ball as it drops into place and then guiding it into the east member. These bumper or cushioning elements may be an integral part of the valve seating member but are more conveniently provided by means of an auxiliary annular ring adapted to be disposed within the valve cage adjacent the conventional replaceable valve seating member, the auxiliary ring having inserts of a resilient, hydrocarbon resistant material around its inner periphery.

Figure 1:
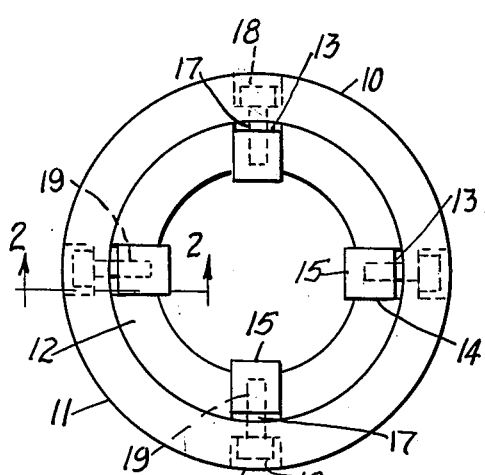
Figure 1 is a plan view of an auxiliary guide ring containing the impact shock absorbing inserts embodying one form of this invention.

Referring now specifically to the drawings and more especially to Figure 1, there is here illustrated one embodiment of this invention. The pump seat guide and impact shock absorber comprises essentially an annular ring 10 having an outside diameter corresponding to that of the normally replaceable pump seat such as are used in conventional ball and seat type valves and a frusto-conical tapered wall 12, the inside diameter of which varies from slightly greater than that of the valve seat itself almost to the outside diameter of the ring. The ring preferably has straight, perpendicular, outer walls 11 and the angle of the inner wall 12 from the vertical may vary from about 15 to 75 degrees depending upon the thickness of the ring and the diameter of the pump seat. The inner periphery of ring 10 is provided with a plurality of at least three vertical notches or slots 13 uniformly spaced apart around the ring. Fitted into each of these notches or slots is a shock-absorbing resilient bumper or cushioning insert 14 of a hydrocarbon resistant natural or synthetic resinous material or rubber. Resilient bumper inserts 14 are generally wedge-shaped appearing in cross-section somewhat like a right triangle having a gently curving elongated S-shaped hypotenuse forming the exposed face 15 (as shown more clearly in Figures 2, 3, and 4). The resilient insert is of a size to fit snugly in notch or slot 13 and project somewhat beyond the inner face 12 of ring 10 but insufficient to extend into the normal seat of the pump ball. Resilient bumper elements 14 are desirably adjustable for radial displacement toward the normal pump seat as the exposed face 15 becomes worn in use. This adjustability is achieved by means of adjusting screws threaded into the resilient member itself or a holder for the resilient element. Outer wall 11 of ring 10 is provided with a depressed seat 16 and threaded opening 17 opposite slot 13 for adjusting screw 18 which in turn fits into threaded opening 19 formed in resilient element 14. As exposed faces 15 of the resilient shock absorbing elements gradually wear away as a result of the repeated battering by the pump ball the bumper elements may be gradually urged inwardly by a slight adjustment of adjusting screw 18 so as to always maintain exposed adequate shock absorbing surface.

Figure 2:
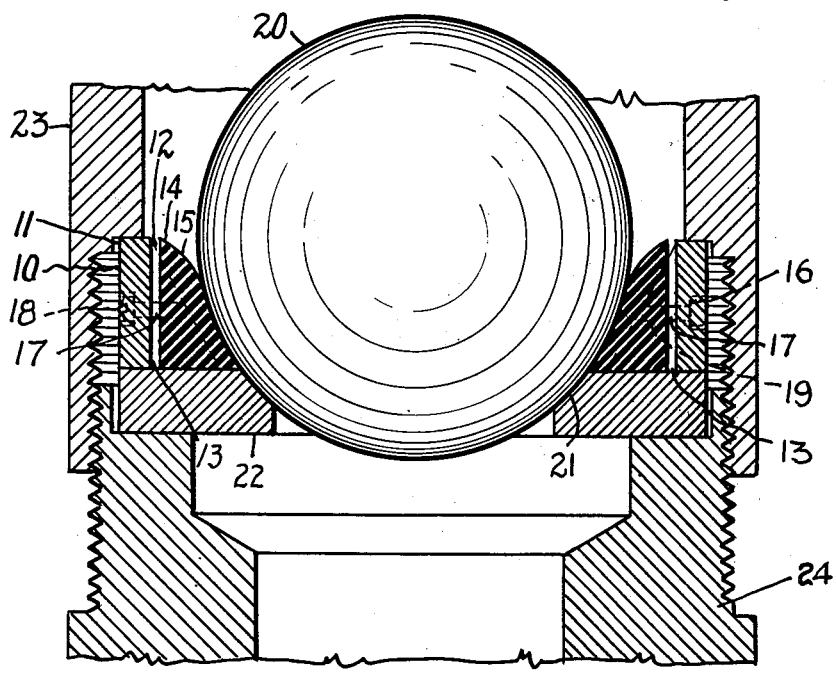
Figure 2 is an enlarged, partly sectional, detail view taken along line 2—2 of Figure 1, showing a single shock absorber element in place with a conventional pump seat in a section of a conventional valve cage.

In Figure 2 there is shown a sectional view of part of the auxiliary shock-absorbing ring of Figure 1 taken along line 2—2, in place in the cage of a conventional ball and seat valve. The spherical valve element or ball 20 is shown resting in annular seat 21 of the normally replaceable annular seat ring 22, in place between the threaded upper section 23 and the threaded lower section 24 forming part of the casing for housing the spherical valve element and annular seat for said valve element as in any conventional ball and seat valve. Shock-absorbing ring 10 rests upon seat ring 22 and is held firmly in place by cage sections 23 and 24. Resilient bumper element 14 is shown in place in slot 13 projecting out beyond the inner face 12 of ring 10 so as to absorb the shock of the initial impact of ball 20 and guide it into seat 21.

Figure 3:
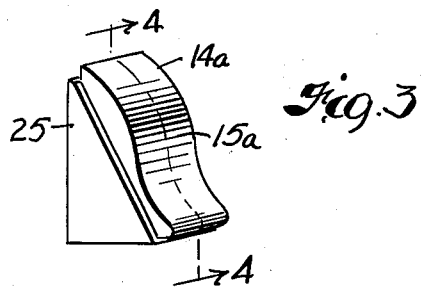
Figure 3 is a perspective view of one form of the shock absorbing element.
Figure 4:
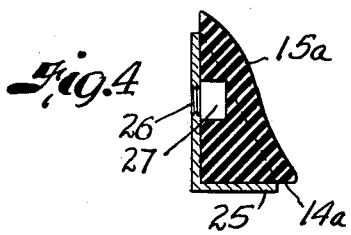
Figure 4 is a sectional view of the embodiment of the shock absorbing element of Figure 3 taken along line 4—4 of that figure.

A modified form of the resilient element is shown in Figures 3 and 4 wherein resilient bumper element 14a is shown partially encased in a holder 25. Holder 25 may be box-like as illustrated or may be formed merely of a right angle of metal or similar material to which the resilient bumper element is adhesively adhered. The back of holder 25 is provided with a threaded opening 26 which will register with threaded opening 17 in ring 10 to provide the requisite means for adjustability and the resilient member is provided with a cavity 27 to receive the end of adjusting screw 18. The exposed face 15a of the resilient bumper element projects somewhat beyond the confines of the holder 25.

Obviously, in adjusting the resilient elements radially inwardly from the guide ring the lower edges of the resilient elements should never be allowed to project out over the edges of the ball seat itself and thus prevent true seating of the ball. Likewise, when the modified form of the invention shown in Figures 3 and 4 is employed, the resilient elements must be replaced before they have worn to such an extent that the sloping sides of holder 25 are exposed and may cause damage to the valve ball.

It will be understood that the shock-absorbing ring containing the several resilient bumper or cushioning element may be constructed integral with the normal seating element which is generally replaceable when worn. It is usually more convenient, however, to form the shock-absorber as a separable auxiliary to the normal seating element. While the shock-absorbing ring may contain as few as three inset resilient bumper elements, four are usually preferred and more than four may be used if desired.

In the operation of a ball and seat valve fitted with the shock-absorbing means of this invention the individual resilient bumper elements disposed in the inner periphery of the shock-absorber ring serve to take up the shock of the initial impact of the valve ball as it drops toward the seat and serve to guide the ball gently and surely into the seat. Economies are not only effected through longer life of both ball and seats but the deformation energy potential in the deformed and loaded resilient bumper elements may contribute to a faster acting pump as the potential energy is released to contribute to the initial ball lift and thereby lessens the oil hydraulic drive required.

While the exposed surfaces of the resilient shock-absorbing bumper elements slowly wear away, this change in dimension of the resilient bumper elements can be compensated for by adjusting them outwardly during periodic shut downs of the well and when the shock-absorbing elements have outworn their usefulness they may be readily replaced, thereby materially prolonging the life of the pump.

The material used to form the resilient bumper elements may be of any rubber or rubber-like synthetic material which is compatible with the fluids being produced from the well. In the case of a deep water well, the selection is not so critical as in the case of an oil well. Because the hydrocarbons in producing oil wells have the effect of swelling and in some cases dissolving natural and some synthetic rubber-like materials, it is important to select a material which is resistant to the destructive action of such hydrocarbons. One such material which is admirably suited for this purpose is "neoprene," the trademark brand name of the E. I. du Pont de Nemours & Company for their synthetic elastomer, chloroprene (2-chlorobutadiene 1,3). Other suitable synthetic materials which have good resistance to hydrocarbons include alkylene polysulfide polymers, butadiene-acrylonitrile copolymers, and tetrafluorethylene polymers. Where the resilient bumper element is to be threaded in order to receive the adjusting screw, it may be necessary in some cases to especially harden that portion of the bumper element in order that it may be threaded, or provide a metallic insert initially molded therein.

It is apparent that many modifications and variations of the invention as hereinbefore set forth may be made without departing from the spirit and scope thereof. The examples given are by way of illustration only and the invention is limited only by the terms of the appended claims.

I claim:

1. In a valve comprising a spherical valve element, an annular seat for said valve element and a casing for housing said valve element and annular seat, the improvement which comprises providing in combination with said annular seat an auxiliary shock-absorbing guide ring having a plurality of at least three slots uniformly spaced apart around the inner periphery of said ring and a resilient, shock-absorbing bumper element inserted in, but projecting from, each of said slots to absorb the shock of the initial impact of said spherical valve element and guide it into said valve seat.

2. A valve according to claim 1 in which the auxiliary guide ring is formed integral with the annular valve seat.

3. In a valve comprising a spherical valve element, an annular seat for said valve element and a casing for housing said valve element and annular seat, the improvement which comprises providing in combination with said annular seat an auxiliary shock-absorbing guide ring, said ring having a frusto-conical opening, a plurality of at least three slots uniformly spaced apart around the inner periphery of said ring and a replaceable, resilient, shock-absorbing bumper element inserted in, but projecting from, each of said slots to absorb the shock of the initial impact of said spherical valve element and guide it into said valve seat.

4. In a valve comprising a spherical valve element, an annular seat for said valve element and a casing for housing said valve element and annular seat, the improvement which comprises providing in combination with said annular seat an auxiliary shock-absorbing guide ring, said ring having a frusto-conical opening, the smallest diameter of said opening being slightly greater than the largest diameter of said annular seat opening, a plurality of at least three slots uniformly spaced apart around the inner periphery of said ring and a replaceable, resilient, shock-absorbing bumper element inserted in, but projecting from, each of said slots to absorb the shock of the initial impact of said spherical valve element and guide it into said valve seat.

5. In a valve comprising a spherical valve element, an annular seat for said valve element and a casing for housing said valve element and annular seat, the improvement which comprises providing in combination with said annular seat an auxiliary shock-absorbing guide ring, said ring having an inverted frusto-conical opening and being adapted to be fitted into said casing disposed upon said annular seat, the smallest diameter of said opening being slightly greater than the largest diameter of said annular seat opening, a plurality of at least three substantially perpendicular slots formed in and uniformly spaced apart around the inner periphery of said ring, a replaceable, resilient, shock-absorbing, generally wedge-shaped bumper element inserted in, but projecting from, each of said slots to absorb the shock of the initial impact of said spherical valve element and guide it into said valve seat, said resilient bumper elements projecting beyond said slots almost to but no farther than the edge of said annular seat opening and said resilient bumper elements being adjustably movable radially, inwardly from said guide ring.

6. An auxiliary shock-absorbing guide ring adapted for use in a ball and seat valve, in combination with said valve seat, said ring having a frusto-conical opening, the smallest diameter of said opening being greater than the largest diameter of said valve seat opening, a plurality of at least three slots formed in and uniformly spaced apart around the inner periphery of said ring and a replaceable, resilient, shock-absorbing, generally wedge-shaped bumper element inserted in, but projecting from, each of said slots to absorb the initial impact of said valve ball and guide it into said valve seat, said resilient bumper elements projecting beyond said slots almost to but no farther than the edge of the valve seat opening.

7. A guide ring according to claim 6 in which the resilient bumper elements are adjustably movable radially, inwardly from said ring.

References Cited in the file of this patent

UNITED STATES PATENTS

| | | |
|---|---|---|
| 343,327 | Lowrie | June 8, 1886 |
| 716,260 | Mersing | Dec. 16, 1902 |
| 1,906,312 | Burt | May 2, 1933 |
| 2,252,924 | Hale | Aug. 19, 1941 |
| 2,293,068 | McLaughlin | Aug. 18, 1942 |
| 2,322,139 | Kaelin | June 15, 1943 |
| 2,354,255 | Gillum | July 25, 1944 |
| 2,417,242 | Eckel | Mar. 11, 1947 |
| 2,591,174 | Martin | Apr. 1, 1952 |
| 2,682,281 | Ecker | June 29, 1954 |

FOREIGN PATENTS

| | | |
|---|---|---|
| 7,614 | Great Britain | of 1901 |
| 203,825 | Great Britain | of 1923 |